US010091059B2

(12) United States Patent
Agarwal et al.

(10) Patent No.: US 10,091,059 B2
(45) Date of Patent: Oct. 2, 2018

(54) HANDLING CONNECTIONS BETWEEN NETWORK DEVICES THAT SUPPORT MULTIPLE PORT COMMUNICATION MODES

(71) Applicant: Brocade Communications Systems, Inc., San Jose, CA (US)

(72) Inventors: Bipin Agarwal, San Jose, CA (US); Kwun-Nan Kevin Lin, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 336 days.

(21) Appl. No.: 14/869,743

(22) Filed: Sep. 29, 2015

(65) Prior Publication Data

US 2016/0173332 A1 Jun. 16, 2016

Related U.S. Application Data

(60) Provisional application No. 62/092,617, filed on Dec. 16, 2014.

(51) Int. Cl.
*H04L 12/24* (2006.01)
*H04L 12/26* (2006.01)

(52) U.S. Cl.
CPC .......... *H04L 41/0816* (2013.01); *H04L 43/08* (2013.01); *H04L 43/0829* (2013.01);
(Continued)

(58) Field of Classification Search
CPC . H04L 41/0816; H04L 43/08; H04L 43/0829; H04L 43/0841; H04L 43/0847;
(Continued)

(56) References Cited

U.S. PATENT DOCUMENTS 4,625,308 A 11/1986 Kim et al.
5,481,073 A 1/1996 Singer et al.
(Continued)

FOREIGN PATENT DOCUMENTS

CN 1441580 A 9/2003
CN 1791064 A 6/2006
(Continued)

OTHER PUBLICATIONS

Office Action dated Apr. 29, 2016; U.S. Appl. No. 14/485,343; (72 pgs.).
(Continued)

*Primary Examiner* — Michael C Lai
(74) *Attorney, Agent, or Firm* — Stewart M. Wiener

(57) ABSTRACT

Techniques for handling connections between network devices that support multiple port communication modes are provided. In one embodiment, a first network device can detect a communication problem between a local port of the first network device and a peer port of a second network device, where the local port supports a plurality of communication modes including a default mode and one or more non-default modes. The first network device can further set the local port to operate in the default mode, receive on the local port a user-configured mode of the peer port from the second network device, and determine a communication mode for the local port from the plurality of communication modes, where the determining is based on the user-configured mode of the peer port and a user-configured mode of the local port. The first network device can then set the local port to operate in the determined communication mode.

23 Claims, 6 Drawing Sheets

(52) U.S. Cl.
CPC ...... *H04L 43/0847* (2013.01); *H04L 43/0852* (2013.01); *H04L 43/16* (2013.01)

(58) Field of Classification Search
CPC .. H04L 43/0852; H04L 43/0864; H04L 43/16
USPC ........................................................ 709/221
See application file for complete search history.

(56) References Cited

U.S. PATENT DOCUMENTS

| | | | |
|---|---|---|---|
| 5,651,003 A | 7/1997 | Pearce et al. | |
| 5,727,170 A * | 3/1998 | Mitchell | G05B 19/05 710/10 |
| 6,111,672 A | 8/2000 | Davis et al. | |
| 6,243,756 B1 | 6/2001 | Whitmire et al. | |
| 6,366,582 B1 | 4/2002 | Nishikado et al. | |
| 6,373,840 B1 | 4/2002 | Chen | |
| 6,490,276 B1 | 12/2002 | Salett et al. | |
| 6,496,502 B1 | 12/2002 | Fite, Jr. et al. | |
| 6,516,345 B1 | 2/2003 | Kracht | |
| 6,526,345 B2 | 2/2003 | Ryoo | |
| 6,597,658 B1 | 7/2003 | Simmons | |
| 6,725,326 B1 | 4/2004 | Patra et al. | |
| 6,765,877 B1 | 7/2004 | Foschiano et al. | |
| 6,807,182 B1 | 10/2004 | Dolphin et al. | |
| 6,839,342 B1 | 1/2005 | Parham et al. | |
| 6,839,349 B2 | 1/2005 | Ambe et al. | |
| 6,850,542 B2 | 2/2005 | Tzeng | |
| 7,093,027 B1 | 8/2006 | Shabtay et al. | |
| 7,099,315 B2 | 8/2006 | Ambe et al. | |
| 7,106,736 B2 | 9/2006 | Kalkunte | |
| 7,136,289 B2 | 11/2006 | Vasavda et al. | |
| 7,184,441 B1 | 2/2007 | Kadambi et al. | |
| 7,206,283 B2 | 4/2007 | Chang et al. | |
| 7,206,309 B2 | 4/2007 | Pegrum et al. | |
| 7,274,694 B1 | 9/2007 | Cheng et al. | |
| 7,313,667 B1 | 12/2007 | Pullela et al. | |
| 7,327,727 B2 | 2/2008 | Rich et al. | |
| 7,336,622 B1 | 2/2008 | Fallis et al. | |
| 7,426,179 B1 | 9/2008 | Harshavardhana et al. | |
| 7,480,258 B1 | 1/2009 | Shuen et al. | |
| 7,496,096 B1 | 2/2009 | Dong et al. | |
| 7,523,227 B1 | 4/2009 | Yager et al. | |
| 7,561,527 B1 * | 7/2009 | Katz | H04L 43/50 370/241 |
| 7,565,343 B2 | 7/2009 | Watanabe | |
| 7,602,787 B2 | 10/2009 | Cheriton | |
| 7,697,419 B1 | 4/2010 | Donthi | |
| 7,933,282 B1 | 4/2011 | Gupta et al. | |
| 7,962,595 B1 | 6/2011 | Jabbar | |
| 8,209,457 B2 | 6/2012 | Engel et al. | |
| 8,307,153 B2 | 11/2012 | Kishore | |
| 8,750,144 B1 | 6/2014 | Zhou et al. | |
| 8,949,574 B2 | 2/2015 | Slavin | |
| 9,032,057 B2 | 5/2015 | Agarwal et al. | |
| 9,038,151 B1 | 5/2015 | Chua et al. | |
| 9,148,387 B2 | 9/2015 | Lin et al. | |
| 9,185,049 B2 | 11/2015 | Agarwal et al. | |
| 9,269,439 B1 | 2/2016 | Levy et al. | |
| 9,282,058 B2 | 3/2016 | Lin et al. | |
| 9,313,102 B2 | 4/2016 | Lin et al. | |
| 9,559,897 B2 | 1/2017 | Lin et al. | |
| 9,577,932 B2 | 2/2017 | Ravipati et al. | |
| 9,628,408 B2 | 4/2017 | Janardhanan et al. | |
| 9,660,937 B2 | 5/2017 | Agarwal et al. | |
| 9,692,652 B2 | 6/2017 | Lin et al. | |
| 9,692,695 B2 | 6/2017 | Lin et al. | |
| 9,853,889 B2 | 12/2017 | Lin et al. | |
| 9,860,133 B2 | 1/2018 | Lin et al. | |
| 2001/0042062 A1 | 11/2001 | Tenev et al. | |
| 2002/0046271 A1 | 4/2002 | Huang | |
| 2002/0101867 A1 | 8/2002 | O'Callaghan et al. | |
| 2003/0005149 A1 | 1/2003 | Haas et al. | |
| 2003/0081556 A1 * | 5/2003 | Woodall | H04L 41/0659 370/241 |
| 2003/0137983 A1 | 7/2003 | Song | |
| 2003/0169734 A1 | 9/2003 | Lu et al. | |
| 2003/0174719 A1 | 9/2003 | Sampath et al. | |
| 2003/0182483 A1 * | 9/2003 | Hawkins | G06F 9/4411 710/110 |
| 2003/0188065 A1 | 10/2003 | Golla et al. | |
| 2005/0063354 A1 | 3/2005 | Garnett et al. | |
| 2005/0141513 A1 | 6/2005 | Oh et al. | |
| 2005/0198453 A1 | 9/2005 | Osaki | |
| 2005/0243739 A1 | 11/2005 | Anderson et al. | |
| 2005/0271044 A1 | 12/2005 | Hsu et al. | |
| 2006/0013212 A1 | 1/2006 | Singh et al. | |
| 2006/0023640 A1 | 2/2006 | Chang et al. | |
| 2006/0072571 A1 | 4/2006 | Navada et al. | |
| 2006/0077910 A1 | 4/2006 | Lundin et al. | |
| 2006/0080498 A1 | 4/2006 | Shoham et al. | |
| 2006/0092849 A1 | 5/2006 | Santoso et al. | |
| 2006/0092853 A1 | 5/2006 | Santoso et al. | |
| 2006/0114899 A1 | 6/2006 | Toumura et al. | |
| 2006/0176721 A1 | 8/2006 | Kim et al. | |
| 2006/0187900 A1 | 8/2006 | Akbar | |
| 2006/0253557 A1 | 11/2006 | Talayco et al. | |
| 2006/0280125 A1 | 12/2006 | Ramanan et al. | |
| 2006/0294297 A1 | 12/2006 | Gupta | |
| 2007/0081463 A1 | 4/2007 | Bohra et al. | |
| 2007/0121673 A1 | 5/2007 | Hammer | |
| 2007/0147271 A1 | 6/2007 | Nandy et al. | |
| 2007/0174537 A1 | 7/2007 | Kao et al. | |
| 2007/0291660 A1 | 12/2007 | Robson et al. | |
| 2008/0137530 A1 | 6/2008 | Fallis et al. | |
| 2008/0192754 A1 | 8/2008 | Ku et al. | |
| 2008/0212497 A1 | 9/2008 | Getachew et al. | |
| 2008/0259555 A1 | 10/2008 | Bechtolsheim et al. | |
| 2008/0275975 A1 | 11/2008 | Pandey et al. | |
| 2008/0281947 A1 | 11/2008 | Kumar | |
| 2009/0125617 A1 | 5/2009 | Klessig et al. | |
| 2009/0135715 A1 | 5/2009 | Bennah | |
| 2009/0141641 A1 | 6/2009 | Akahane et al. | |
| 2010/0172365 A1 | 7/2010 | Baird et al. | |
| 2010/0182933 A1 | 7/2010 | Hu et al. | |
| 2010/0185893 A1 | 7/2010 | Wang et al. | |
| 2010/0257283 A1 | 10/2010 | Agarwal | |
| 2010/0284414 A1 | 11/2010 | Agarwal et al. | |
| 2010/0293200 A1 | 11/2010 | Assarpour | |
| 2010/0329111 A1 | 12/2010 | Wan et al. | |
| 2011/0092202 A1 | 4/2011 | Mattisson et al. | |
| 2011/0142077 A1 | 6/2011 | Wong et al. | |
| 2011/0238923 A1 | 9/2011 | Hooker et al. | |
| 2011/0268123 A1 | 11/2011 | Kopelman et al. | |
| 2011/0280258 A1 * | 11/2011 | Klingen | H04L 41/0816 370/437 |
| 2012/0020373 A1 | 1/2012 | Subramanian et al. | |
| 2012/0087232 A1 | 4/2012 | Hanabe et al. | |
| 2012/0131123 A1 | 5/2012 | Yan | |
| 2012/0155485 A1 | 6/2012 | Saha et al. | |
| 2012/0246400 A1 | 9/2012 | Bhadra et al. | |
| 2013/0170495 A1 | 7/2013 | Suzuki et al. | |
| 2013/0201984 A1 | 8/2013 | Wang | |
| 2013/0215791 A1 | 8/2013 | Lin et al. | |
| 2013/0232193 A1 | 9/2013 | Ali et al. | |
| 2013/0262377 A1 | 10/2013 | Agarwal et al. | |
| 2014/0003228 A1 | 1/2014 | Shah et al. | |
| 2014/0006706 A1 | 1/2014 | Wang | |
| 2014/0071985 A1 | 3/2014 | Kompella et al. | |
| 2014/0075108 A1 | 3/2014 | Dong et al. | |
| 2014/0112190 A1 | 4/2014 | Chou et al. | |
| 2014/0112192 A1 | 4/2014 | Chou et al. | |
| 2014/0122791 A1 | 5/2014 | Fingerhut | |
| 2014/0126354 A1 | 5/2014 | Hui et al. | |
| 2014/0153573 A1 | 6/2014 | Ramesh et al. | |
| 2014/0181275 A1 | 6/2014 | Lin et al. | |
| 2014/0269402 A1 | 9/2014 | Vasseur et al. | |
| 2014/0314082 A1 | 10/2014 | Korpinen et al. | |
| 2014/0334494 A1 | 11/2014 | Lin et al. | |
| 2014/0341079 A1 | 11/2014 | Lin et al. | |
| 2014/0341080 A1 | 11/2014 | Lin et al. | |
| 2014/0362852 A1 | 12/2014 | Janardhanan et al. | |
| 2014/0376361 A1 | 12/2014 | Hui et al. | |
| 2015/0016277 A1 | 1/2015 | Smith et al. | |

(56) References Cited

U.S. PATENT DOCUMENTS

| | | | |
|---|---|---|---|
| 2015/0036479 | A1 | 2/2015 | Gopalarathnam |
| 2015/0055452 | A1 | 2/2015 | Lee |
| 2015/0117263 | A1 | 4/2015 | Agarwal et al. |
| 2015/0124826 | A1 | 5/2015 | Edsall et al. |
| 2015/0229565 | A1 | 8/2015 | Ravipati et al. |
| 2015/0271861 | A1* | 9/2015 | Li .............. H04W 76/023 455/426.1 |
| 2015/0281055 | A1 | 10/2015 | Lin et al. |
| 2015/0288567 | A1 | 10/2015 | Lin et al. |
| 2016/0021697 | A1* | 1/2016 | Vargantwar ........ H04W 76/028 370/329 |
| 2016/0028652 | A1 | 1/2016 | Agarwal et al. |
| 2016/0173339 | A1 | 6/2016 | Lin et al. |

FOREIGN PATENT DOCUMENTS

| | | |
|---|---|---|
| CN | 101478435 A | 7/2009 |
| CN | 102684999 A | 9/2012 |
| EP | 2924927 A1 | 9/2015 |
| WO | 2015026950 | 2/2015 |

OTHER PUBLICATIONS

Pei et al.: "Putting Routing Tables in Silicon", IEEE Network, IEEE Service Center, New York, NY; vol. 6, No. 1, Jan. 1, 1992; pp. 42-50.
Hsiao et al.: "A High-Throughput and High-Capacity IPv6 Routing Lookup System", Computer Networks, Elsevier Science Publishers B.V., Amsterdam, NL, vol. 57, No. 3, Nov. 16, 2012, pp. 782-794.
Extended European Search Report dated Jul. 30, 2015 for EP Appln. 15000834.0; 8 pages.
Notice of Allowance dated Sep. 17, 2015; U.S. Appl. No. 14/268,507 (15 pgs.).
U.S. Appl. No. 14/876,639, filed Oct. 6, 2015 by Agarwal et al.
Notice of Allowance dated Oct. 30, 2015; U.S. Appl. No. 13/850,118 (12 pgs.).
Response to Office Action dated Jul. 16, 2015; U.S. Appl. No. 14/094,931; Response filed Nov. 12, 2015 (13 p.).
Office Action dated Nov. 20, 2015; U.S. Appl. No. 14/106,302; (14 pgs.).
Notice of Allowance dated Dec. 14, 2015; U.S. Appl. No. 14/094,931 (25 pgs.).
U.S. Appl. No. 62/092,617, filed Dec. 16, 2014 by Agarwal et al.
Office Action dated Feb. 18, 2016; U.S. Appl. No. 14/463,419; (74 pgs.).
Notice of Allowance dated Oct. 13, 2016; U.S. Appl. No. 14/106,302; (23 pgs.).
Final Office Action dated Aug. 24, 2016; U.S. Appl. No. 14/171,152; (39 pgs.).
NonFinal Office Action dated Nov. 9, 2016; U.S. Appl. No. 14/506,943; (18 pgs.).
Final Office Action dated Nov. 1, 2016; U.S. Appl. No. 14/485,343; (31 pgs.).
NonFinal Office Action dated Mar. 23, 2017; U.S. Appl. No. 14/171,152; (14 pgs.).
Notice of Allowance dated Mar. 22, 2017; U.S. Appl. No. 14/506,943; (22 pgs.).
Notice of Allowance dated Apr. 13, 2017; U.S. Appl. No. 14/485,343; (25 pgs.).
NonFinal Office Action dated May 4, 2017; U.S. Appl. No. 15/051,601; (62 pgs.).
Chinese Office Action dated May 16, 2017 Appln. No. 201380065745.X.
Notice of Allowance dated Aug. 24, 2017; U.S. Appl. No. 15/051,601; (23 pgs.).
Notice of Allowance dated Sep. 13, 2017; U.S. Appl. No. 14/171,152; (30 pgs.).
Final Office Action dated Jun. 3, 2016; U.S. Appl. No. 14/106,302; (35 pgs.).
Rooney et al.: "Associative Ternary Cache for IP Routing", IEEE, pp. 409-416, 2004.
"Starburst: Building Next-Generation Internet Devices", Sharp et al., Bell Labs Technical Journal, Lucent Technologies, Inc., pp. 6-17, 2002.
NonFinal Office Action dated Jun. 23, 2016; U.S. Appl. No. 14/530,193; (73 pgs.).
NonFinal Office Action dated Jul. 13, 2016; U.S. Appl. No. 14/876,639; (69 pgs.).
Notice of Allowance dated Jan. 6, 2017; U.S. Appl. No. 14/530,193; (18 pgs.).
Final Office Action dated Jan. 26, 2017; U.S. Appl. No. 14/463,419; (57 pgs.).
Notice of Allowance dated Feb. 8, 2017; U.S. Appl. No. 14/876,639; (25 pgs.).
NonFinal Office Action dated Jun. 15, 2017; U.S. Appl. No. 14/463,419; (35 pgs.).
29—Chinese Office Action dated Jul. 24, 2017 Appln. No. 201510142392.X; 8 pages.
30—Pei et al.: Putting Routing Tables in Silicon, IEEE Network Magazine, Jan. 31, 1992, 9 pages.
31—Qingsheng et al.: Designing of Packet Processing Chip Routers, Aug. 31, 2001, China Academic Journal Electronic Publishing House, 4 pages (No English version).
32—Hsiao et al.: A High-Throughput and High-Capacity IPv6 Routing Lookup System, Nov. 16, 2012, Computer Networks, 13, pages.
Office Action dated Feb. 23, 2016; U.S. Appl. No. 14/171,152; (61 pgs.).
Amendment to Carrier Multiple Access with Collision Detection (CSMA/CD Access Method and Physical Layer Specifications—Aggregation of Multi[ple Link Segments; IEEE Std. 802.3ad; 2000; 183 pages.
Appeal Brief Dated Jan. 18, 2013; U.S. Appl. No. 12/463,964 (23p.).
Brocade: "FastIron Ethernet Switch"; Administration Guide; Supporting FastIron Software Release 08.0.00; Apr. 30, 2013; 400 pages.
Brocade: "FastIron Ethernet Switch"; IP Multicast Configuration Guide; Supporting FastIron Software Release 38.0.00; Apr. 30, 2013; 212 pages.
Brocade: "FastIron Ethernet Switch"; Stacking Configuration Guide; Supporting FastIron Software Release 08.0.00; Apr. 30, 2013; 170 pages.
Brocade: "FastIron Ethernet Switch"; Traffic Management Guide; Supporting FastIron Software Release 08.0.00; Apr. 30, 2013; 76 pages.
Cisco: "Cisco StackWise and StackWise Plus Technology"; technical white paper; C11-377239-01; 10/10; Copyright 2010; 11 pages.
Cisco: "Delivering High Availability in the Wiring Closet with Cisco Catalyst Switches"; technical white paper; C11-340384-01; 01/07; Copyright 1992-2007; 8 pages.
Configure, Verify, and Debug Link Aggregation Control Program (LACP); allied Telesyn; 2004; 10 pages.
Dell: "Stacking Dell PowerConnect 7000 Series Switches"; A Dell Technical White Paper; Jul. 2011; 34 pages.
DLDP Techology White Paper; H3C products and solutions; 2008; 8 pages; http://www.h3c.com/portal/Products_Solutions/Technology/LAN/Technology_White_Paper/200812/623012_57_0.htm.
Examiner's Answer dated May 7, 2013; U.S. Appl. No. 12/463,964 (12 p.).
Extreme Networks Technical Brief: "SummitStack Stacking Technology"; 1346_06; 12/10; 8 pages.
Final Office Action dated Jan. 23, 2012; U.S. Appl. No. 12/463,964 (11 p.).
Fischer et al.: "A Scalable ATM Switching System Architecture"; IEEE Journal on Selected Areas in Communications, IEEE Service Center, Piscataway, US, vol. 9, No. 8, Oct. 1, 1991; pp. 1299-1307.
International Search Report and Written Opinion for International Appln. No. PCT/US2013/076251 dated May 22, 2014, 11 pages.

(56) References Cited

OTHER PUBLICATIONS

Juniper Networks datasheet entitled: "Juniper Networks EX 4200 Ethernet Switches with Virtual Chassis Technology"; Dated Aug. 2013 (12 p.).
Link Aggregation According to IEEE Standard 802.3ad; SysKonnect GmbH; 2002; 22 pages.
Link Aggregation; http://en.wikipedia.org/wiki/Link_aggregation; downloaded from Internet on Dec. 16, 2013; 9 pages.
M. Foschiano; Cisco Systems UniDirectional Link Detection (UDLD) Protocol; Memo; Apr. 2008; 13 pages; Cisco Systems.
Migration from Cisco UDLD to industry standard DLDP; technical white paper; Feb. 2012; 12 pages; Hewlett-Packard Development Company.
Office Action dated Mar. 21, 2011; U.S. Appl. No. 12/463,964 (10 P.).
Partial International Search Report for PCT/US2014/051903 dated Nov. 18, 2014.
Reply Brief dated Jul. 8, 2013; U.S. Appl. No. 12/463,964 (14 p.).
Response to Office Action dated Mar. 21, 2011; U.S. Appl. No. 12/463,964; Response filed Sep. 21, 2011 (12 p.).
Suckfuell: "Evolution of EWSD During the Eighties"; Institute of Electrical and Electronics Engineers; Global Telecommunications Conference; San Diego; Nov. 28-Dec. 1, 1983; [Global Telecommunications Conference], New York, IEEE, US, vol. 2, Nov. 1, 1983; pp. 577-581.
U.S. Appl. No. 14/094,931, filed Dec. 3, 2013 by Lin et al.
U.S. Appl. No. 14/106,302, filed Dec. 13, 2013 by Lin et al.
U.S. Appl. No. 14/171,152, filed Feb. 3, 2014 by Lin et al.
U.S. Appl. No. 14/207,146, filed Mar. 12, 2014 by Lin et al.
U.S. Appl. No. 14/268,507, filed May 2, 2014 by Agarwal (Unpublished).
U.S. Appl. No. 14/463,419, filed Aug. 19, 2014 by Lee (Unpublished).
U.S. Appl. No. 14/485,343, filed Sep. 12, 2014 by Lin et al (Unpublished).
U.S. Appl. No. 14/506,943, filed Oct. 6, 2014 by Lin et al (Unpublished).
U.S. Appl. No. 14/530,193, filed Oct. 31, 2014 by Ravipati et al (Unpublished).
U.S. Appl. No. 61/745,396, filed Dec. 21, 2012 by Lin et al.
U.S. Appl. No. 61/799,093, filed Mar. 15, 2013 by Lin et al.
U.S. Appl. No. 61/822,216, filed May 10, 2013 by Lin et al.
U.S. Appl. No. 61/825,449, filed May 20, 2013 by Lin et al.
U.S. Appl. No. 61/825,451, filed May 20, 2013 by Lin et al.
U.S. Appl. No. 61/868,982, filed Aug. 22, 2013 by Lee.
U.S. Appl. No. 61/898,295, filed Oct. 31, 2013 by Agarwal.
U.S. Appl. No. 61/938,805, filed Feb. 12, 2014 by Ravipati et al.
U.S. Appl. No. 61/971,429, filed Mar. 27, 2014 by Sinha et al.
U.S. Appl. No. 61/974,924, filed Apr. 3, 2014 by Lin et al.
Understanding and Configuring the Undirectional Link Detection Protocol Feature; Cisco support communication; Jul. 9, 2007; Document ID No. 10591; 5 pages; http://www.cisco.com/c/en/us/support/docs/lan-switching/spanning-tree-protocol/10591-77.html.
International Search Report and Written Opinion for International Appln. No. PCT/US2014/051903 dated Jan. 27, 2015, 16 pages.
Final Office Action dated Feb. 13, 2015; U.S. Appl. No. 13/850,118; (14 p.).
Office Action dated Jul. 16, 2015; U.S. Appl. No. 14/094,931; (41 pgs.).
Notice of Allowance dated Aug. 3, 2015; U.S. Appl. No. 14/207,146 (38 pgs.).
Final Office Action dated Dec. 11, 2017; U.S. Appl. No. 14/463,419; (45 pgs.).

\* cited by examiner

HANDLING CONNECTIONS BETWEEN NETWORK DEVICES THAT SUPPORT MULTIPLE PORT COMMUNICATION MODES

CROSS-REFERENCES TO RELATED APPLICATIONS

The present application claims the benefit and priority under U.S.C. 119(e) of U.S. Provisional Application No. 62/092,617, filed Dec. 16, 2014, entitled "TECHNIQUES FOR HANDING CONNECTIONS BETWEEN FLEXIBLE STACKING PORTS." The entire contents of this provisional application are incorporated herein by reference for all purposes.

BACKGROUND

In the field of computer networking, a "stacking system" or "stack" is a group of physical network devices that are linked together to operate as a single, logical network device. Each member device of a stack is known as a unit and includes stacking ports for connecting with other units in the same stack, and as well as data ports for connecting with upstream/downstream hosts and/or networks.

In some stack implementations, the stacking ports of a unit can be configured to operate in one of two different communication modes: a data mode and a stacking mode. Such stacking ports are referred to as flexible stacking ports. This capability allows the flexible stacking ports to utilize a high-performance stacking protocol when set to stacking mode. This capability also allows the flexible stacking ports to be used as regular data ports when set to data mode, which can be useful in scenarios where the unit is deployed as a standalone unit (i.e., not as part of a stack). Generally speaking, a user/administrator of the unit can configure a desired communication mode for a given flexible stacking port via one or more command line interface (CLI) commands. The unit can then apply this user-configured communication mode to set the actual communication mode that is employed by the port firmware/hardware at runtime.

One complication with implementing flexible stacking ports (and other similar ports that support multiple communication modes) is that two units in a stack may unable to communicate with each other upon being connected via their respective flexible stacking ports if there is a mismatch in communication modes. For example, consider a stack that comprises a unit A with a flexible stacking port P1. Assume that an administrator initially configures P1 to operate in stacking mode. Further assume that the administrator later connects a new unit B to unit A by linking P1 of A to a flexible stacking port P2 of B, where P2 is configured to operate in data mode. In this scenario, since the communication mode of P1 (i.e., stacking mode) does not match the communication mode of P2 (i.e., data mode), units A and B may be unable to exchange data over the link connecting P1 and P2 due to, e.g., protocol or signaling incompatibilities between the two modes.

It is possible to avoid this problem by having the administrator manually set the configuration of P2 (using the CLI command(s) mentioned above) to operate in stacking mode prior to connecting ports P2 and P1 together. However, such manual configuration can be cumbersome to perform in large-scale stacking deployments and can prevent the use of automated stack creation processes. Further, in cases where a link between two flexible stacking ports that was previously working goes down (due to, e.g., an inadvertent mode change of one port), it may not be clear to the administrator which port needs to be reconfigured or which communication mode should be used.

SUMMARY

Techniques for handling connections between network devices that support multiple port communication modes are provided. In one embodiment, a first network device can detect a communication problem between a local port of the first network device and a peer port of a second network device, where the local port supports a plurality of communication modes including a default mode and one or more non-default modes. The first network device can further set the local port to operate in the default mode, receive on the local port a user-configured mode of the peer port from the second network device, and determine a communication mode for the local port from the plurality of communication modes, where the determining is based on the user-configured mode of the peer port and a user-configured mode of the local port. The first network device can then set the local port to operate in the determined communication mode.

The following detailed description and accompanying drawings provide a better understanding of the nature and advantages of particular embodiments.

DETAILED DESCRIPTION

Figure 1:
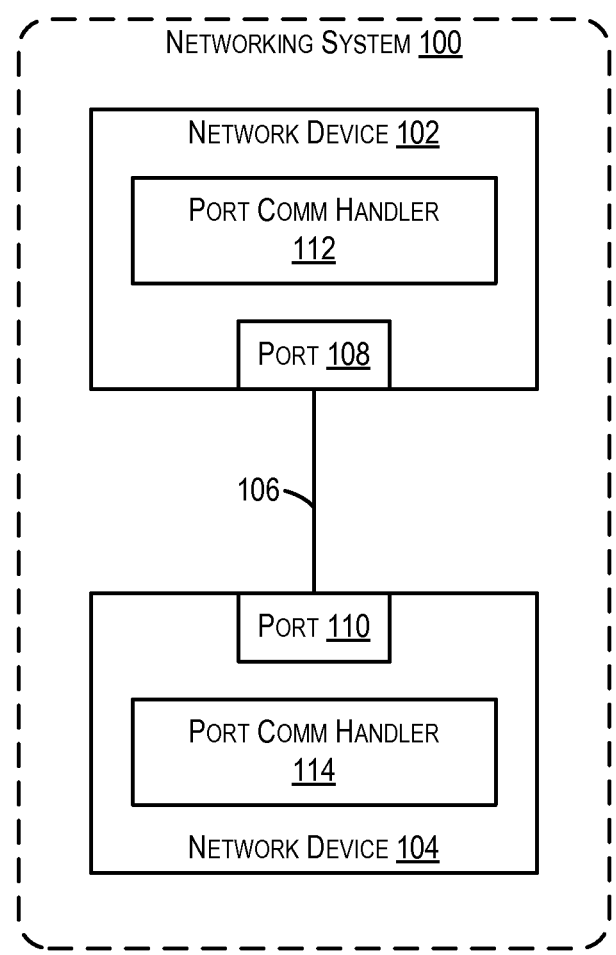
FIG. 1 depicts a networking system according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques for handling connections between network devices that support multiple port communication modes in a manner that allows the network devices to successfully recover from communication problems arising out of a mismatch of such modes. More particularly, in scenarios where (1) a first port of a first network device is connected to a second port of a second network device, (2) the first and second ports each support multiple communication modes (e.g., a default mode and one or more other, non-default modes), and (3) the first and second ports cannot communicate with each other due to a mismatch in modes, the techniques of the present disclosure can enable the first and second network devices to negotiate a common communication mode that is most appropriate for the first and second ports (based on, e.g., user configuration on the devices). The first and second network devices can then set the communication modes of their respective ports to the negotiated mode, thereby resolving the mode mismatch and enabling the first and second ports to communicate using the common, negotiated mode.

To achieve this, in one set of embodiments, when it is determined that the first and second ports cannot communicate or exchange data, the first and second network devices can each set the communication mode of its respective port to a default mode. In certain embodiments, this default mode can be a basic port communication mode that is known to be supported by both devices. The first and second network devices can perform this step regardless of the user-configured communication mode that has been defined for its port by, e.g., a user/administrator of the device. For example, even if the user-configured communication mode for the first port is a non-default mode, the first network device can set the actual communication mode for the first port (i.e., the mode actually used by the port firmware/hardware) to the default mode. Similarly, even if the user-configured communication mode for the second port is a non-default mode, the second network device can set the actual communication mode for the second port to the default mode.

In a particular embodiment, the first and second network devices can set their respective ports to the default mode as described above only after detecting the existence of the communication problem for a contiguous, predefined time period. This wait period can advantageously avoid race conditions that may cause the ports to rapidly toggle between different modes.

Once the first and second ports have been set to the default mode, the first and second network devices can exchange control packets with each other (over the link connecting the first and second ports) in order to learn the user-configured communication mode of the respective peer port at the other end of the link. For instance, the first network device can send out control packets to/receive control packets from the second network device that enable the first network device to learn the user-configured communication mode of the second port, and the second network device can send out control packets to/receive control packets from the first network device that enable the second network device to learn the user-configured communication mode of the first port. The first and second network devices can then each determine, based on the user-configured communication mode of the peer port and the user-configured communication mode of its local port, the most appropriate communication mode for its local port. Although the logic that is used to make this determination may change depending on the implementation context and/or the types of modes supported, in various embodiments the same logic can be employed by both the first and second network devices, thereby causing the devices to arrive at a common communication mode for the first and second ports.

If the first and second network devices determine that the most appropriate communication mode for the first and second ports is the default mode, no further processing is needed since the ports have already been set to the default mode. However, if the first and second network devices determine that the most appropriate communication mode for the first and second ports is a common non-default mode m, each device can (1) send a verification packet to the other indicating that the mode of its local port will be changed to m, (2) wait for a predefined period of time after sending the verification packet, (3) change the communication mode of its local port to m, and optionally (4) wait for another predefined period of time after changing the mode to m. The wait period at (2) ensures that each side is able to successfully receive the verification packet. The wait period at (4) can be used in certain embodiments to ensure that each side is able to successfully complete the mode changeover to mode m. Finally, at the conclusion of (3) or optionally (4), the first and second network devices can begin communicating with each other over the link while operating in mode m. The first and second network devices can also continue to monitor for communication problems between the first and second ports and can re-execute the steps above if another problem is detected.

With the foregoing techniques, there is no need for an administrator of a networking system to manually configure port communication modes to ensure mode compatibility between the linked devices of the system, or to figure out how to adjust such modes in the case of a communication failure that occurs due to a mode mismatch. Instead, the devices of the system can automatically negotiate and set a common port communication mode that enables communication between their respective ports. This, in turn, can significantly simply system creation/deployment, system modification (e.g., unit replacement), and troubleshooting/debugging.

In some embodiments, the techniques of the present disclosure may be specifically implemented by units in a stacking system to address a communication mode mismatch between flexible stacking ports connecting the units. In these embodiments, the units can initially set their respective flexible stacking ports to data mode (which can be considered the default mode in this context), and can negotiate to determine whether the flexible stacking ports should be changed over to stacking mode (which can be considered a non-default mode). In other embodiments, these techniques may be implemented by any other type of network device whose ports support two or more communication modes (e.g., one default mode and one or more non-default modes).

The foregoing and other aspects of the present disclosure are described in further detail in the sections that follow.

2. Networking System

FIG. 1 depicts a networking system 100 in which embodiments of the present disclosure may be implemented. As shown, networking system 100 includes two network devices 102 and 104 that are communicatively coupled to each other via a link 106 connecting port 108 of device 102 to port 110 of device 104. Network devices 102 and 104 can be physical network devices (e.g., physical switches, routers, etc. running on specialized hardware) or virtual network devices (e.g., software-based switches, routers, etc. running on a general purpose computer system). In a particular embodiment, network devices 102 and 104 can be stackable units of a stacking system. Although exactly two network devices are depicted, it should be appreciated that networking system 100 may support any number of such devices, connected according to any topology (e.g., linear, ring, star, mesh, etc.).

In various embodiments, each port 108/110 of network device 102/104 can support multiple communication modes, where the multiple communication modes include a default mode and one or more additional (non-default) modes. For example, in the embodiment where devices 102 and 104 are stackable units, ports 108 and 110 may be flexible stacking ports that each support a default data mode (sometimes referred to as "IEEE mode") and a non-default stacking mode (sometimes referred to as "HG2 mode"). A user/administrator of networking system 100 can configure the desired communication mode for ports 108 and 110 via, e.g., a CLI made available on network devices 102 and 10—this is referred to as the "user-configured mode" of each port. Each network device 102/104 can then apply the user-configured communication mode to set the actual communication mode of its local port 108/110 that is used by the port's firmware/hardware to send and receive packets at runtime.

As mentioned previously, one complication with interconnecting network devices via ports that can operate using different communication modes is that, in certain scenarios, the ports may operate in mismatched modes. For instance, port 108 of network device 102 may be configured to operate in mode m1 while port 110 of network device 104 may be configured to operate in mode m2. Depending on how each network device is implemented, this mode mismatch may prevent ports 108 and 110 from communicating with each other over link 106.

To address this and other similar problems, each network device 102/104 of FIG. 1 includes a novel port communication handler 112/114. Port communication handlers 112 and 114 can be implemented in software, hardware, or a combination thereof. As described in further detail below, port communication handlers 112 and 114 can enable network devices 102 104 to reset their respective ports 108 and 110 to the default mode in the case of a communication problem. Once in the default mode, port communication handlers 112 and 114 can negotiate a common communication mode for ports 108 and 110, where this negotiated mode is based on the user-configured modes for the ports as defined on the devices. Finally, port communication handlers 112 and 114 can change over ports 108 and 110, in concert, from the default mode to the negotiated mode (if the negotiated mode is different from the default mode). Thus, port communication handlers 112 and 114 can automatically set the communication modes of ports 108 and 110 in a manner that ensures the ports can communicate with each other over link 106, while also taking into consideration the desired communication mode of each port (as defined by their user-configured modes).

It should be appreciated that networking system 100 of FIG. 1 is illustrative and not intended to limit embodiments of the present disclosure. For example, the various components shown in FIG. 1 may have sub-components or functions that are not specifically described. One of ordinary skill in the art will recognize other modifications, variations, and alternatives.

3. Workflow

Figure 2A:
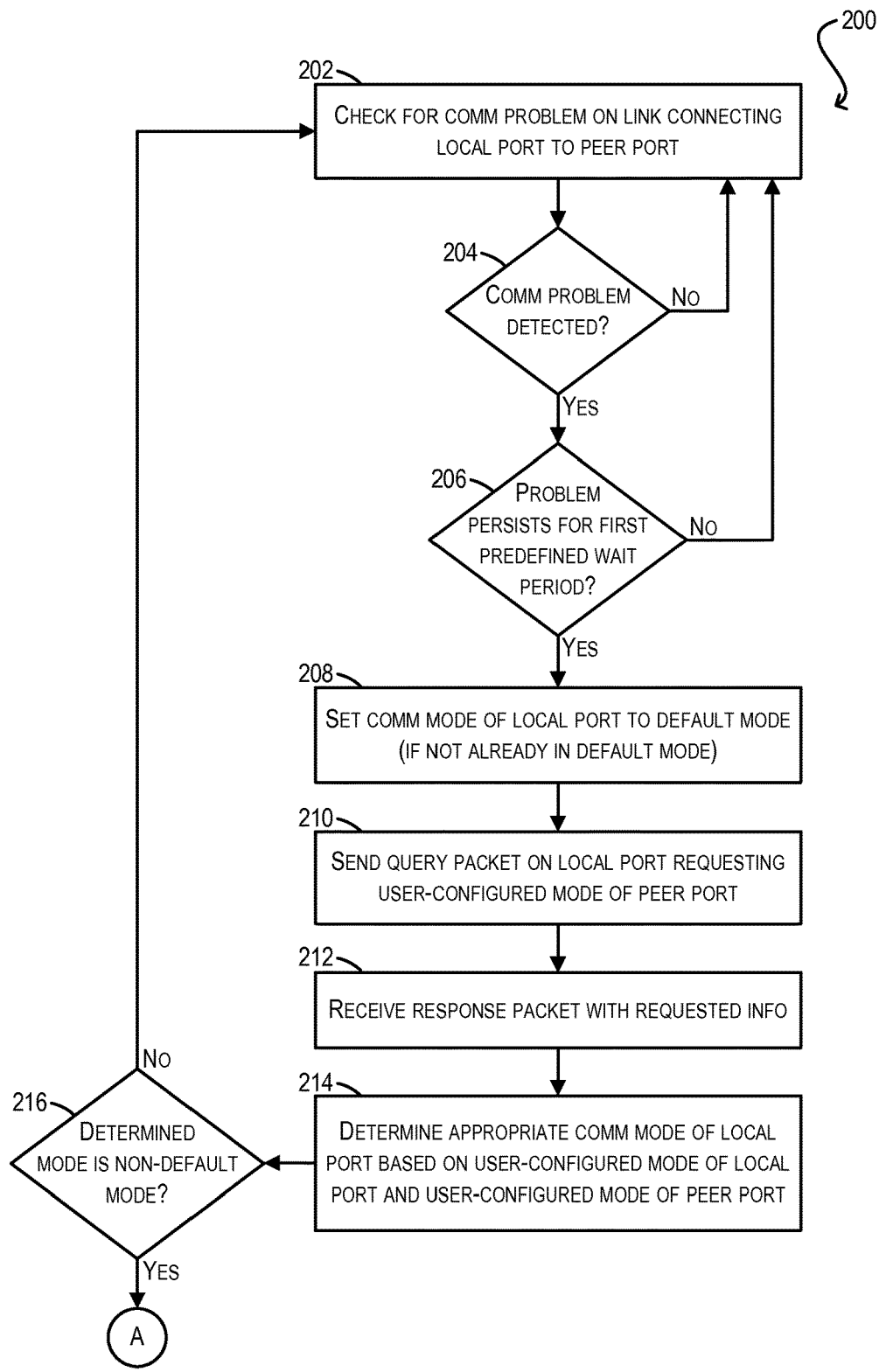
FIGS. 2A and 2B depict a workflow for handling a communication problem between ports that support multiple communication modes according to an embodiment.
Figure 2B:
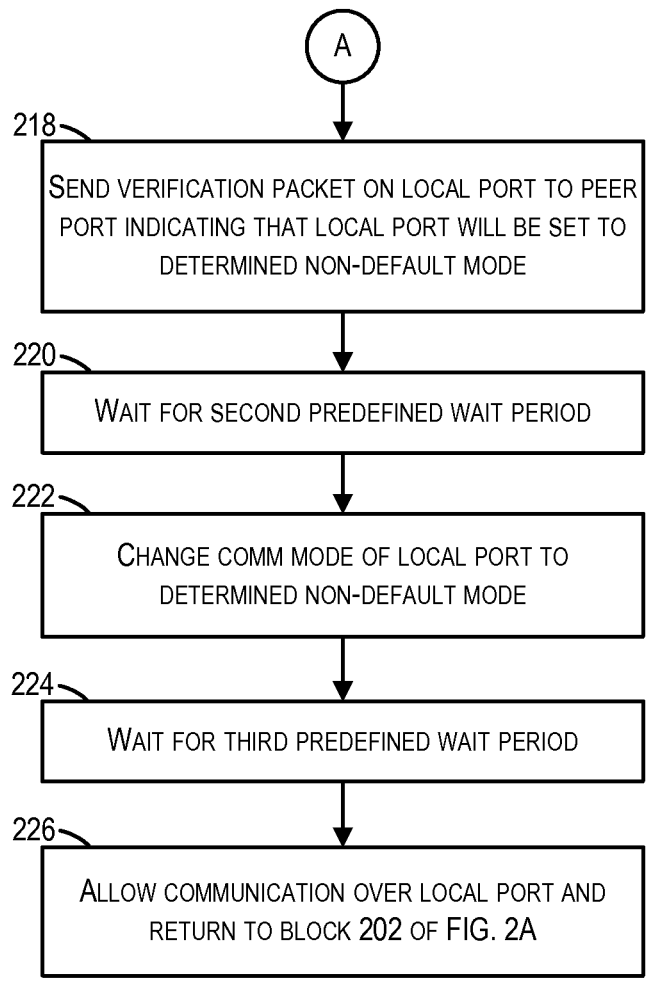

FIGS. 2A and 2B depict a workflow 200 that may be performed by each port communication handler 112/114 of FIG. 1 to address mode mismatches between ports 108 and 110 that result in a communication problem/failure according to an embodiment. It is assumed that workflow 200 is performed at substantially at the same time by handlers 112 and 114.

Starting with block 202 of FIG. 2A, port communication handler 112/114 can check for a communication problem on link 106 connecting its local port to the peer port on the other end of the link. Evidence of such a communication problem can include, e.g., being unable to send or receive packets, a packet drop or error rate that is higher than a threshold, an average packet latency that is higher than a threshold, and/or the like. It should be noted that the occurrence of this communication problem is not strictly limited to situations where the local port is in a "down" state; the state of the local port may be "up," but the port may still experience issues sending/receiving packets according to any of the criteria mentioned above. Further, a communication problem on link 106 may arise at any point during runtime of network device 102/104 (e.g., immediately upon initialization/boot-up, after some period of successful operation, etc.).

If no communication problem is detected (block 204), workflow 200 can loop back to block 202 and port communication handler 112/114 can continue to monitor for problems. However, if a communication problem is detected, port communication handler 112/114 can carry out a negotiation process for addressing a potential communication mode mismatch between the local port and the peer port. For example, at blocks 206 and 208, port communication handler 112/114 can check whether the communication problem persists for a contiguous first predefined wait period and, if so, can set the communication mode of the local port to the port's default mode (if not already in the default mode). The purpose of the first wait period at block 206 is to ensure that the communication problem is not transient; if the problem is transient and each port communication handler 112/114 attempts to immediately change its local port to the default mode, a race condition may occur where each side ends up toggling between different modes in a continuous manner. The purpose of setting the communication mode of the local port to the default mode at block 208 is to ensure that both sides of link 106 are initialized to a common mode for negotiation purposes. In a particular embodiment, the default mode can be a basic mode that is known to be supported by network devices 102/104 and most other network devices in the same category, such as IEEE mode in the case of a stacking system.

Once the local port has been set to the default mode, port communication handler 112/114 can send out a query packet on link 106 (to the other port communication handler 112/114) requesting the user-configured communication mode of the peer port (block 210). As mentioned previously, this user-configured mode is typically defined by a user/administrator and reflects the mode that the user/administrator would like the port to operate in. In some embodiments, the user-configured mode can also be set by a software agent/process within networking system 100 (e.g., a software configurator process running on the local device or on a master device in the system).

Figure 3:
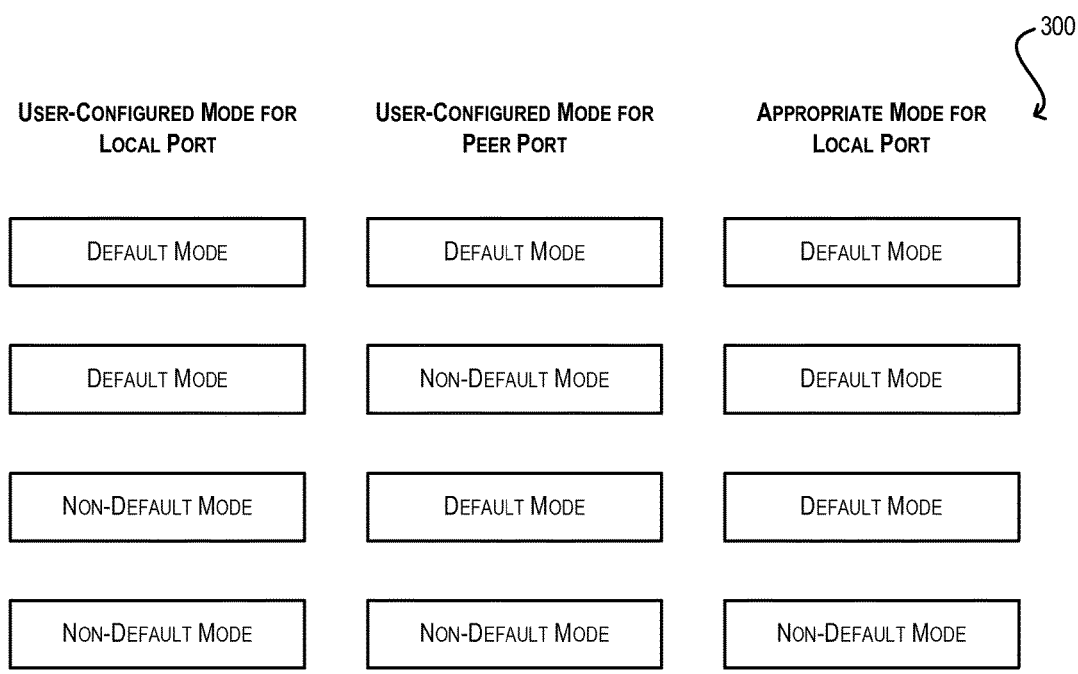
FIG. 3 depicts a diagram for determining an appropriate communication mode for a local port based on user-configured modes of the local port and its peer port according to an embodiment.

Port communication handler 112/114 can then receive a response packet from the other port communication handler with the requested information (block 212) and can determine an appropriate communication mode for the local port based on the user-configured mode of the local port and the user-configured mode of the peer port (as received in the response packet) (block 214). The particular logic that handler 112/114 uses at block 214 to determine the appropriate communication mode can vary depending on the nature of the modes supported by the local and peer ports. For example, FIG. 3 depicts a diagram 300 indicating what the appropriate communication mode of the local port may be in a scenario where there are only two possibilities for the user-configured modes of the local and peer ports (i.e., the default mode and a non-default mode). The mappings shown in diagram 300 will change if the number of supported modes increases and/or the relationships between the modes (e.g., their degree of compatibility) are modified.

If port communication handler 112/114 determines that the appropriate communication mode for the local port is the default mode (block 216), workflow 200 can return to the start since the local port has already been set to operate in default mode per block 208. On the other hand, if port communication handler 112/114 determines that the appropriate communication mode for the local port is a non-default mode m, workflow 200 can proceed to FIG. 2B.

At blocks 218-222 of FIG. 2B, port communication handler 112/114 can send out a verification packet on link 106 to the other handler indicating that the local port will be set to non-default mode m, wait for a second predefined wait period, and at the conclusion of that period, change the communication mode of the local port to m. The purpose of the second wait period at block 220 is to ensure that the other handler has sufficient time to receive the verification packet and initiate a parallel mode changeover on that end.

Finally, at blocks 224 and 226, port communication handler 112/114 can optionally wait for a third predefined wait period and, at the conclusion of that period, allow communication to be initiated over the local port. The purpose of the third wait period at block 224 is to ensure that the local port (and the peer port) have been changed over to mode m in a stable state and are ready to begin exchanging packets at block 226. It should be noted that, in certain embodiments, this third predefined wait period can be omitted. Finally, workflow 200 can return to block 202 so that port communication handler 112/114 can monitor for further communication problems. If another problem is detected, port communication handler 112/114 can restart the negotiation process.

It should be appreciated the workflow 200 of FIGS. 2A and 2B is illustrative and various modifications are possible. For example, in some embodiments, the local port handled by port communication handler 112/114 may be part of a trunk between network devices 102 and 104. In these cases, port communication handler 112/114 can repeat workflow 200 for each port/link in the trunk.

Further, certain models of network devices may not need the processing of workflow 200 because they implement chipsets that allow for compatibility between various port communication modes. In these cases, port communication handler 112/114 can perform an initial check to determine whether its local port falls into this category and, if so, can skip the entirety of workflow 200. One of ordinary skill in the art will recognize other variations, modifications, and alternatives.

4. Network Switch

Figure 4:
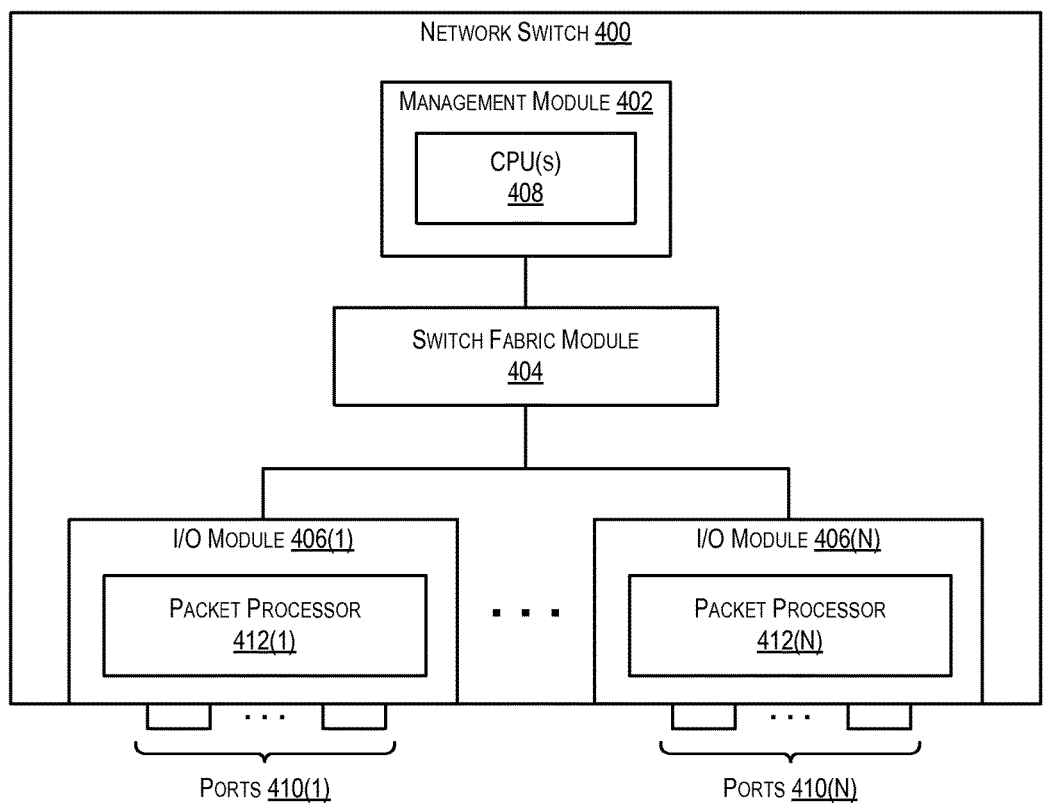
FIG. 4 depicts a network device according to an embodiment.

FIG. 4 depicts an exemplary network switch 400 that may be used to implement, e.g., network device 102 and/or 104 of FIG. 1 according to an embodiment. In a particular embodiment, network switch 400 can be a stackable switch that is used in a stacking system.

As shown, network switch 400 includes a management module 402, a switch fabric module 404, and a number of I/O modules 406(1)-406(N). Management module 402 represents the control plane of network switch 400 and thus includes one or more management CPUs 408 for managing/controlling the operation of the device. Each management CPU 408 can be a general purpose processor, such as a PowerPC, Intel, AMD, or ARM-based processor, that operates under the control of software stored in an associated memory (not shown). In one embodiment, management CPU 408 can carry out the operations attributed to port communication handler 112/114 in the foregoing disclosure.

Switch fabric module 404 and I/O modules 406(1)-406(N) collectively represent the data, or forwarding, plane of network switch 400. Switch fabric module 404 is configured to interconnect the various other modules of network switch 400. Each I/O module 406(1)-406(N) can include one or more input/output ports 410(1)-410(N) that are used by network switch 400 to send and receive data packets. Ports 410(1)-410(N) can comprise data ports for communicating with hosts/other network devices, as well as stacking ports for communicating with other units in the same stack (in embodiments where switch 400 is a stackable switch). Each I/O module 406(1)-406(N) can also include a packet processor 412(1)-412(N). Packet processor 412(1)-412(N) is a hardware processing component (e.g., an FPGA or ASIC) that can make wire speed decisions on how to handle incoming or outgoing data packets.

It should be appreciated that network switch 400 is illustrative and not intended to limit embodiments of the present disclosure. Many other configurations having more or fewer components than switch 400 are possible.

5. Computer System

Figure 5:
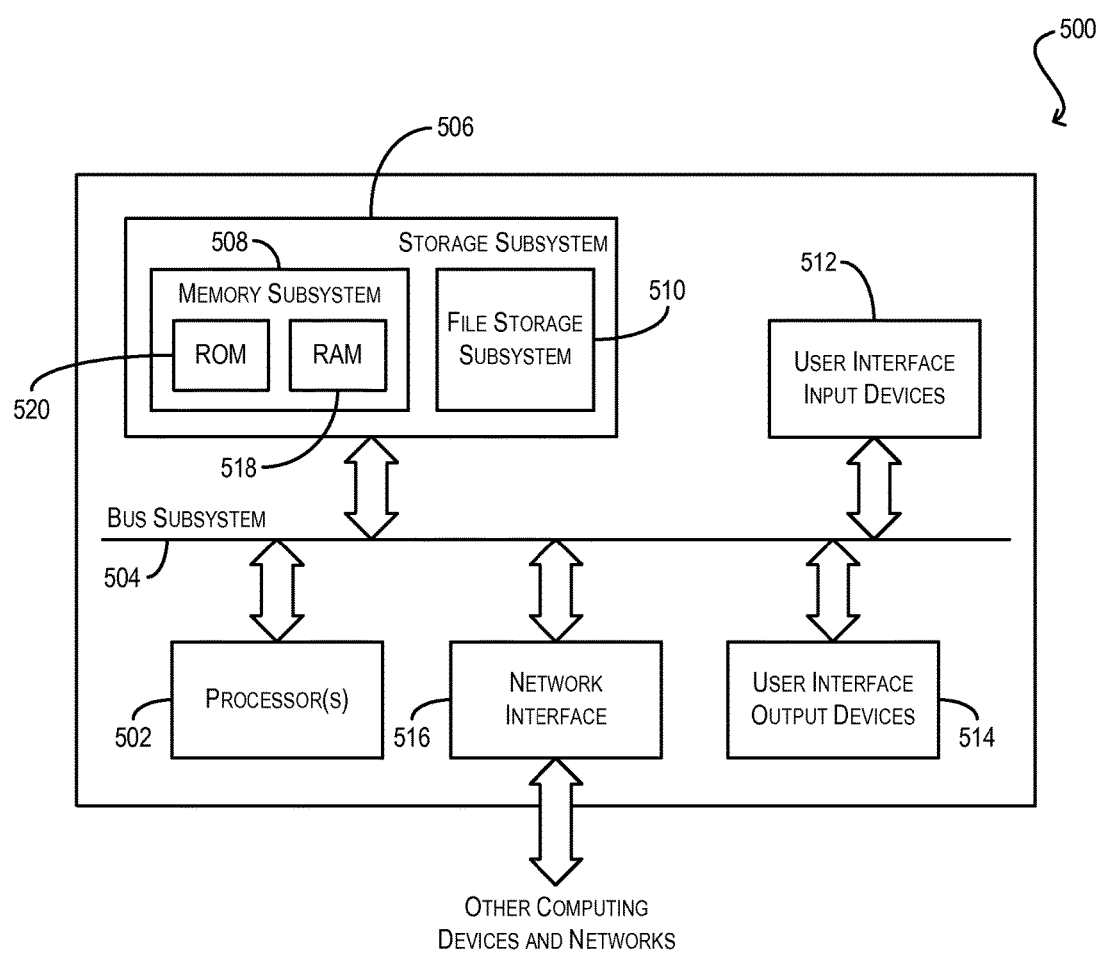
FIG. 5 depicts a computer system according to an embodiment.

FIG. 5 depicts an exemplary computer system 500 that may be used to implement, e.g., a virtual version of network device 102 and/or 104 of FIG. 1 according to an embodiment.

As shown in FIG. 5, computer system 500 can include one or more processors 502 that communicate with a number of peripheral devices via a bus subsystem 504. These peripheral devices can include a storage subsystem 506 (comprising a memory subsystem 508 and a file storage subsystem 510), user interface input devices 512, user interface output devices 514, and a network interface subsystem 516.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computing devices or networks. Embodiments of network interface subsystem 516 can include wired (e.g., coaxial, twisted pair, or fiber optic Ethernet) and/or wireless (e.g., Wi-Fi, cellular, Bluetooth, etc.) interfaces.

User interface input devices 512 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 500.

User interface output devices 514 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 500.

Storage subsystem 506 can include a memory subsystem 508 and a file/disk storage subsystem 510. Subsystems 508 and 510 represent non-transitory computer-readable storage media that can store program code and/or data that provide the functionality of various embodiments described herein.

Memory subsystem 508 can include a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and not intended to limit embodiments of the present disclosure. Many other configurations having more or fewer components than computer system 500 are possible.

The above description illustrates various embodiments of the present disclosure along with examples of how certain aspects may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    detecting, by a first network device, a communication problem between a local port of the first network device and a peer port of a second network device, wherein the local port supports a plurality of communication modes including a default mode and one or more non-default modes, and wherein the communication problem is caused by a communication mode mismatch between the local port of the first network device and the peer port of the second network device;
    setting, by the first network device, the local port to operate in the default mode;
    receiving, by the first network device on the local port, a user-configured mode of the peer port from the second network device, the receiving being performed upon the second network device setting the peer port to also operate in the default mode;
    determining, by the first network device, a communication mode for the local port from the plurality of communication modes, the determining being based on the user-configured mode of the peer port and a user-configured mode of the local port; and
    setting, by the first network device, the local port to operate in the determined communication mode,
    wherein the user-configured mode of the local port is a communication mode that has been configured for the local port in software by a user or software agent on the first network device, and wherein the user-configured mode of the peer port is a communication mode that has been configured for the peer port in software by a user or software agent on the second network device.

2. The method of claim 1 wherein detecting the communication problem comprises at least one of:
    detecting that the local port cannot send or receive packets;
    detecting a packet drop rate at the local port that exceeds a drop rate threshold;
    detecting a packet error rate at the local port that exceeds an error rate threshold; or
    detecting a packet latency at the local port that exceeds a latency threshold.

3. The method of claim 1 wherein the default mode is a communication mode that is supported by both the local port and the peer port.

4. The method of claim 1 wherein setting the local port to operate in the default mode comprises:
    causing the local port's firmware and hardware to operate in the default mode, regardless of the user-configured mode of the local port.

5. The method of claim 1 further comprising, prior to setting the local port to operate in the default mode:
    checking whether the communication problem persists for a predefined wait period.

6. The method of claim 1 further comprising, prior to receiving the user-configured mode of the peer port:
    sending, to the second network device via the local port, a request for the user-configured mode of the peer port.

7. The method of claim 1 wherein the plurality of communication modes include the default mode and exactly one non-default mode.

8. The method of claim 7 wherein determining the communication mode for the local port comprises:
    if the user-configured mode of the local port is the default mode and the user-configured mode of the peer port is the default mode, determining that the communication mode of the local port should be the default mode.

9. The method of claim 7 wherein determining the communication mode for the local port comprises:
    if the user-configured mode of the local port is the default mode and the user-configured mode of the peer port is the non-default mode, determining that the communication mode of the local port should be the default mode.

10. The method of claim 7 wherein determining the communication mode for the local port comprises:
    if the user-configured mode of the local port is the non-default mode and the user-configured mode of the peer port is the default mode, determining that the communication mode of the local port should be the default mode.

11. The method of claim 7 wherein determining the communication mode for the local port comprises:
    if the user-configured mode of the local port is the non-default mode and the user-configured mode of the peer port is the non-default mode, determining that the communication mode of the local port should be the default mode.

12. The method of claim 1 wherein setting the local port to operate in the determined communication mode comprises:
    causing the local port's firmware and hardware to switch over from operating in the default mode to operating in the determined communication mode.

13. The method of claim 1 further comprising, prior to setting the local port to operate in the determined communication mode:
    waiting for a predefined wait period.

14. The method of claim 1 further comprising, subsequently setting the local port to operate in the determined communication mode:
    allowing packet communication over the local port.

15. The method of claim 14 further comprising, prior to allowing packet communication over the local port:
waiting for a predefined wait period.

16. The method of claim 14 further comprising, subsequently to allowing packet communication over the local port:
checking for any further communication problems between the local port and the peer port.

17. The method of claim 1 wherein the first and second network devices are stackable units in a stacking system, and wherein the local and peer ports are flexible stacking ports.

18. The method of claim 17 wherein the default mode is a data mode and wherein the one or more non-default modes include a stacking mode.

19. A non-transitory computer readable storage medium having stored thereon program code executable by a first device, the program code causing the first device to:
detect a communication problem between a local port of the first device and a peer port of a second device, wherein the local port supports a plurality of communication modes including a default mode and one or more non-default modes, and wherein the communication problem is caused by a communication mode mismatch between the local port of the first network device and the peer port of the second network device;
set the local port to operate in the default mode;
receive, on the local port, a user-configured mode of the peer port from the second device upon the second network device setting the peer port to also operate in the default mode;
determine a communication mode for the local port from the plurality of communication modes, the determining being based on the user-configured mode of the peer port and a user-configured mode of the local port; and
set the local port to operate in the determined communication mod;
wherein the user-configured mode of the local port is a communication mode that has been configured for the local port in software by a user or software agent on the first network device, and wherein the user-configured mode of the peer port is a communication mode that has been configured for the peer port in software by a user or software agent on the second network device.

20. The non-transitory computer readable storage medium of claim 19 wherein the first device is a physical network device.

21. The non-transitory computer readable storage medium of claim 19 wherein the first device is a computer system.

22. A network device comprising:
a processor;
a local port for connecting the network device to a peer port of another network device, the local port supporting a plurality of communication modes including a default mode and one or more non-default modes; and
a non-transitory computer readable medium having stored thereon program code that, when executed by the processor, causes the processor to:
detect a communication problem between the local port and the peer port, the communication problem being caused by a communication mode mismatch between the local port of the network device and the peer port of said another network device;
set the local port to operate in the default mode;
receive, on the local port, a user-configured mode of the peer port from said another network device upon said another network device setting the peer port to also operate in the default mode;
determine a communication mode for the local port from the plurality of communication modes, the determining being based on the user-configured mode of the peer port and a user-configured mode of the local port; and
set the local port to operate in the determined communication mode,
wherein the user-configured mode of the local port is a communication mode that has been configured for the local port in software by a user or software agent on the network device, and wherein the user-configured mode of the peer port is a communication mode that has been configured for the peer port in software by a user or software agent on said another network device.

23. The network device of claim 22 wherein the network device is a network switch.

* * * * *